UNITED STATES PATENT OFFICE.

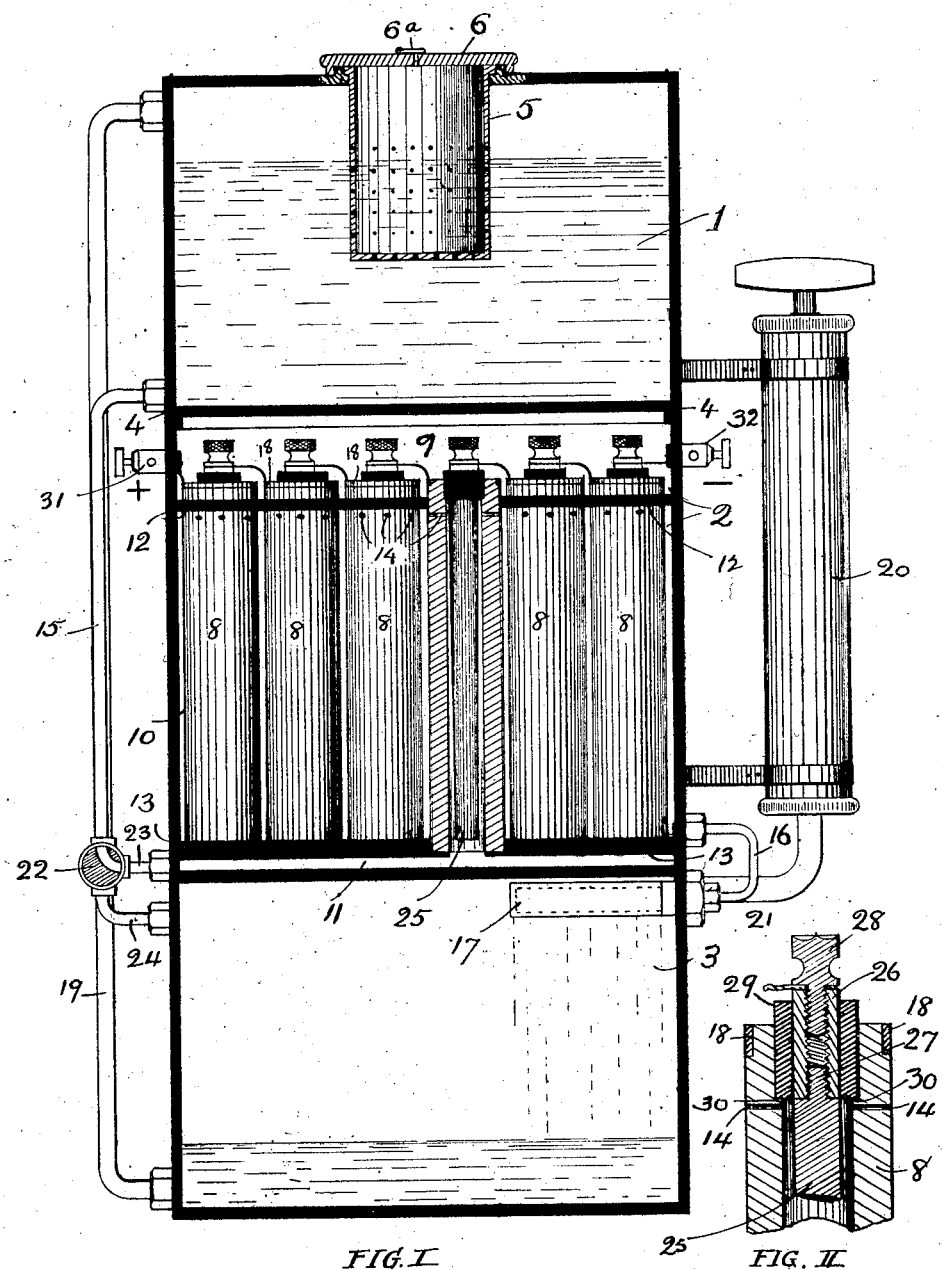

CHARLES E. HITE, OF PHILADELPHIA, PENNSYLVANIA, ASSIGNOR TO HITE ELECTRIC COMPANY, A CORPORATION OF DELAWARE.

PRIMARY BATTERY.

No. 857,880.     Specification of Letters Patent.     Patented June 25, 1907.

Application filed November 15, 1904. Serial No. 232,796.

*To all whom it may concern:*

Be it known that I, CHARLES E. HITE, a citizen of the United States, residing at Philadelphia, in the county of Philadelphia and State of Pennsylvania, have invented a new and useful Primary Battery, of which the following is a specification.

My invention relates to improvements in primary batteries of the single electrolyte or exciting fluid depolarizing type. My object being to produce a battery of cells arranged in multiple, series, or multiple series.

My invention provides means for the circulation of an electrolyte or exciting fluid common to all the cells at the same time and so as to maintain a constant current at a constant voltage.

My invention also comprises means whereby, by the series arrangement of cells, a high voltage and low current is obtained, resulting in the minimum of consumption of zinc or negative element, and thereby decreasing the cost per watt hour.

Referring to the drawings—Figure 1 is an elevation of my battery with one end removed and showing the perforated vessel at the top in a vertical section and also a two-way valve on the left in section. Fig. 2 is a fragmentary view in vertical section of the upper part of a cell.

Similar numerals refer to similar parts throughout the several views.

Referring to Fig. 1, I provide the three compartments; 1, 2 and 3, one above the other in the order named, made of hard acid proof rubber or other suitable material. These compartments may be contained in one vessel or structure or may be entirely separate so long as their relative positions are maintained for the proper circulation of the electrolyte. Compartment 1 is preferably detachable from the structure beneath it at 4, 4 so that it may be removed to give access to compartment 2 containing the batteries. Through the top of compartment 1 is suspended the perforated vessel 5 which is adapted to receive the acid bi-chromate compound in the solid state. This vessel is provided with a removable cover 6, water being poured into vessel 5 through the compound. The electrolyte solution flows into compartment 1; an air valve 6ª is provided in the cover 6 which may be opened when the battery is in operation and may be closed when the battery is out of operation. In compartment 2 are placed the battery cells 8, one of which is shown in vertical section. These cells as above stated, may be connected in any combination of series, or multiple or multiple series. Compartment 2 may be further divided in sub-compartments 9, 10 and 11,: 9 and 10 being separated by the partition 12, having apertures to permit the projection of the cells therethrough while 10 and 11 are separated by the perforated partition 13. Through partition 12 project the upper ends of cells 8 while the lower ends of these cells rest and are sealed in the countersunk portion of partition 13 and open through corresponding openings in said partition 13 into the sub-compartment 11. Near the upper extension of cells 8 are provided a horizontal row of perforations 14 just below the partition 12. The conducting pipe 15 carries the electrolyte from compartment 1 to sub-compartment 11 by gravity, and said electrolyte passes upwardly through said cells 8 and outwardly through the apertures 14 into sub-compartment 10 from whence it is carried through pipe 16 to filter 17 and thence to the overflow compartment 3. The cells 14 are surrounded by an exterior coating of insulation, such for instance as an acid proof paint or varnish, extending from partition 12 to partition 13. It will thus be noticed that the electrolyte travels upwardly through each cell from sub-compartment 11 out through apertures 14 into sub-compartment 10 and thence through filter 17 to compartment 3. It is to be understood that the compartments 1, 2, 3, and 11 are preferably of the same horizontal dimensions in both directions and that consequently compartment 11 is of a width equal to or greater than the cross section dimension of each cell. It thus follows that the width of the volume of electrolyte in compartment 11, connecting all of the cells is equal to or greater than the cross section dimension of any cell. It is important that the volume of connecting electrolyte should be a relatively substantial one, as above described, in order to reduce to a minimum the internal resistance of the combination of cells. The upper part of the carbon cells 8 are recessed and provided with the metallic rings 18 for the purpose of electrical connection with the zinc of the adjoining cell. It will thus be seen that during the flow of the electrolyte from compartment 1 through the cells to compartment 3, a constant electric energy is generated. The filter 17 which may be of terra cotta or other suitable substance is adapted to filter the electrolyte from the insoluble matter contained therein so that said electrolyte is again ready for use. When all the electrolyte has flowed from compartment 1 to compartment 3 it may be returned from compartment 3 back to compartment 1 through pipe 19 for which purpose the air pump 20 is provided communicating through pipe 21 with the upper part of compartment 3 for the purpose of forcing air under pressure into compartment 3. A suitable check valve being provided to prevent back pressure through pipe 16. When it is desired to arbitrarily interrupt the flow of electrolyte through the cells the two-way valve 22 may be turned from the position shown in Fig. 1 in which communication is maintained through pipe 15 and 23 into the position which will cut off such communication between 23 and 15 and establish communication between 23 and 24. This will not only prevent the further flow of electrolyte through pipe 15 to sub-compartment 11 but will also permit of the flow of electrolyte from sub-compartment 11 to compartment 3 thus resulting in immediately emptying all the cells of electrolyte.

In Fig. 2 I show a convenient means for utilizing the usual zinc 25 in its usual commercial form. I provide a metallic sleeve 26 being threaded interiorly and adapted to coöperate with the threaded projection 27 of zinc 25 and adapted to receive at its upper end the threaded projection of the binding screw 28. This sleeve 26 is surrounded by the insulating member 29 which is firmly secured thereto and is adapted to rest upon the shoulders 30 of the carbon cells 8. It will thus be noted that by locating the apertures 14 almost at the upper extension of the zinc 25 the maximum use of said zinc is secured. As the consumption of the zinc is more rapid at its upper extension it is preferable to make the zinc electrodes slightly tapering toward their lower extensions, as shown in Fig. 1. The cells are connected in the usual way for example the first carbon 8 to the left is connected to the binding post 31 and the zinc of that carbon is connected to the next adjoining carbon and so on to the right hand end of the row where the zinc is connected to the binding post 32.

While I have described, as a specific instance of the manner of working of my invention, the use of a carbon and zinc couple, and an acid bichromate electrolyte, it is obvious that I may readily use a different couple and a different exciting fluid and still be within the scope of my invention.

What I claim is:—

1. In a primary battery the combination of a plurality of cells, a body of electrolyte, the cells opening at their bottoms into said body of electrolyte and means for causing a flow of electrolyte from said body upwardly through the cells and then downwardly upon the outside walls thereof.

2. In a primary battery the combination of a plurality of cells, a body of electrolyte common to all the cells, the cells opening at their bottoms into said body of electrolyte and means for causing a flow of electrolyte from said body upwardly through the cells and then downwardly upon the outside walls thereof.

3. In a primary battery the combination of a plurality of cells, a body of electrolyte having horizontal dimensions equal to or greater than the horizontal dimensions of the cells, the cells opening at their bottoms into said body of electrolyte and means for causing a flow of electrolyte upwardly through the cells and then downwardly upon the outside walls thereof.

4. In a primary battery the combination of a plurality of couples, one of each couple forming or contributing in the formation of a compartment open at the bottom, a body of electrolyte communicating with each compartment through the bottom thereof and having a horizontal dimension equal to or greater than the horizontal dimensions of the compartments, and means for causing a flow of the electrolyte upwardly through the compartments and then downwardly upon the outside walls thereof.

5. In a primary battery the combination of a reservoir, means for producing and introducing thereto an electrolyte, a plurality of cells, means for causing a flow of the electrolyte from the reservoir upwardly through the cells and then downwardly upon the outside walls thereof, means for receiving the overflow of electrolyte from said cells and for returning the electrolyte back to the reservoir and means for arbitrarily interrupting the flow of electrolyte from the reservoir to the cells and at the same time drawing off electrolyte from the cells.

6. In a primary battery, the combination of a reservoir, means for producing and introducing thereto an electrolyte, a plurality of cells, means for causing the flow of the electrolyte from the reservoir upwardly through the cells and then downwardly upon the outside walls thereof, and, means for receiving the overflow of electrolyte from said cells and for filtering the same.

7. In a primary battery, the combination of a plurality of cells having insulated outer walls, a body of electrolyte, the cells opening at their bottoms into said body, and means for causing the flow of electrolyte from said body upwardly through the cells and then downwardly upon the outside of said cells and over said insulation.

8. In a primary battery, the combination of a plurality of cells having insulated outer walls, a body of electrolyte, the cells opening at their bottoms into said body, means for causing the flow of electrolyte from said body upwardly through the cells and then downwardly upon the outside of said cells and over said insulation, and a common chamber or receptacle for receiving the overflow of electrolyte.

9. In a primary battery, the combination of a plurality of cells having insulated outer walls, a body of electrolyte, the cells opening at their bottoms into said body, means for causing the flow of electrolyte from said body upwardly through the cells and then downwardly upon the outside of said cells and over said insulation, a common chamber or receptacle for receiving the overflow of electrolyte, and means for filtering the electrolyte as it passes therefrom.

CHARLES E. HITE.

Witnesses:
 MAE HOFMANN,
 HORACE D. REEVE.